United States Patent Office 2,816,256
Patented Dec. 10, 1957

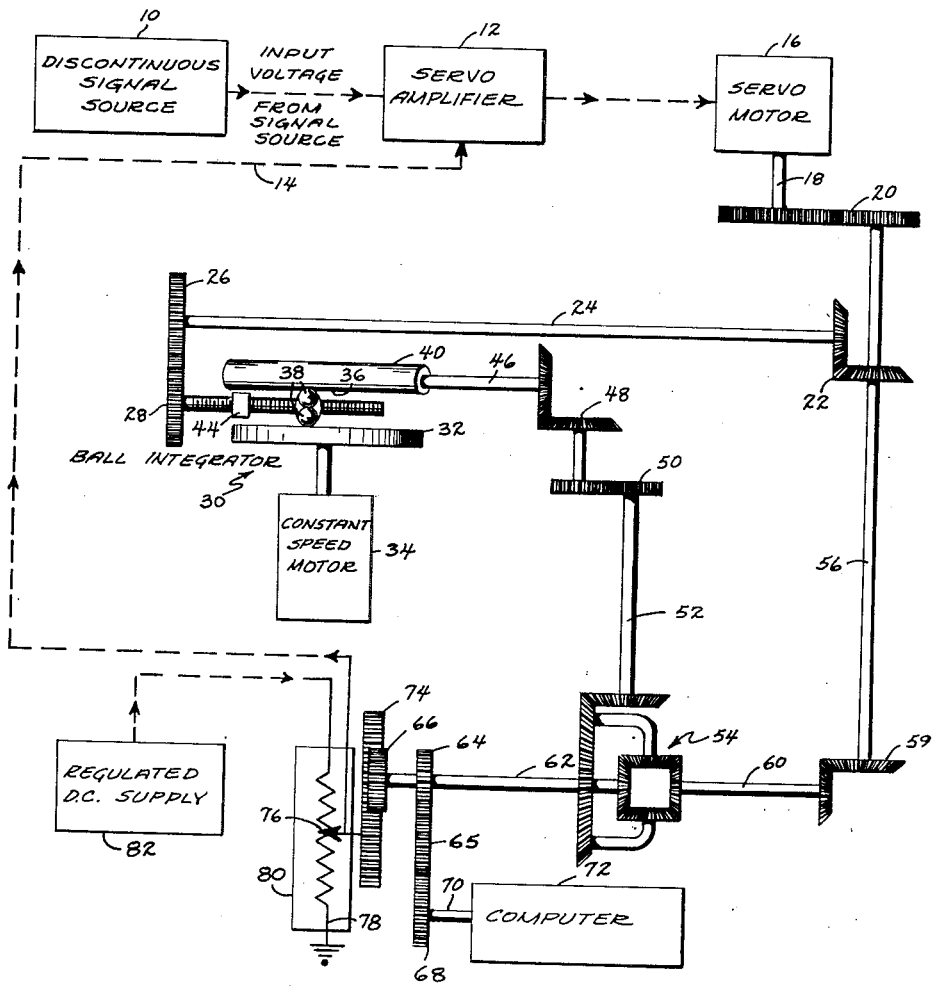

2,816,256
EXTRAPOLATING SERVOSYSTEM

Murray J. Harpole and Thomas R. James, St. Paul, Minn., assignors to General Mills, Inc., a corporation of Delaware Application April 9, 1956, Serial No. 576,999

5 Claims. (Cl. 318—28)

This invention relates in general to servo motor systems and pertains more particularly to an electromechanical extrapolator capable of providing a continuous output signal even though a discontinuous input signal is received.

The primary object of the invention is to provide a device or system capable of receiving discontinuous input information which is variable with respect to a function such as time and to provide output information which varies substantially continuously with respect to said function and which is a continuous extrapolation of the pointwise input information.

Another object of the invention is to provide a system of the foregoing character which is exceedingly simple in its construction and which will be relatively inexpensive to manufacture. Also it is an aim of the invention to provide a system that will be quite rugged and reliable for relatively long periods of time without especial maintenance attention.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

The single figure presented is a diagrammatic view of the system with the components thereof presented largely in block form.

Referring now in detail to the schematic diagram, it is to be observed that a discontinuous signal source bearing the numeral 10 is utilized in supplying an interrupted signal to a servo amplifier 12. The servo amplifier receives a feedback signal 14 which will be described in greater detail hereinafter. However, for the present, it will suffice to say that the signal from the source 10 is combined with the feedback signal 14 and any difference produces an error signal which is delivered to a servo motor 16. The magnitude of the error signal is responsible for determining the speed at which the servo motor functions and of course the phase relationship between the two signals determines the direction in which the servo motor 16 rotates. The output shaft 18 from the servo motor 16 is connected to a set of reduction gears 20 and by means of enmeshed beveled gears 22 it will be observed that a power take-off in the form of a shaft 24 is provided.

The shaft 24 carries at one end thereof a gear 26 which is drivingly connected to a driven gear 28 associated with a ball and disc integrator designated generally by the numeral 30. As can be seen from the diagram, the ball and disc integrator comprises a disc 32 driven at a constant rate by a constant speed motor 34. Further included in the ball and disc integrator is a ball carriage 36 containing ball elements 38, the lower of which balls is in engagement with the disc 32 and the upper of which is in engagement with a cylindrical roller 40. The ball carriage 36 is rendered mobile by means of a threaded shaft 42 supported at 44 and driven by the gear 28.

The roller 40 has a shaft 46 connected thereto which in turn drives a set of beveled gears 48. The output from the beveled gears 48 is mechanically fed to a pair of reduction gears 50 and a shaft 52 connects the reduction gears 50 to a mechanical differential 54. The output from the servo motor 16 via the reduction gears 20 and the beveled gears 22 is also transmitted to the differential 54 by way of a shaft 56 connected to a set of beveled gears 58 which cause rotation of a shaft 60 having direct mechanical connection with the differential 54.

The differential 54 is provided with an output shaft 62 having a first gear 64 carried thereon and a second gear 66. The first gear 64 is in mesh with an idler gear 65 and the idler gear drives a driven gear 68 which is carried by a shaft 70. To the shaft 70 is attached a computer mechanism designated by the numeral 72. The other gear 66 on the shaft 62 is meshed with a gear rack 74, the rack 74 supporting a wiper arm 76 which contacts the resistance 78 of a potentiometer denoted by the numeral 80. The potentiometer resistance 78 is electrically connected to a regulated D. C. supply 82. It is the wiper arm 76 that is instrumental in producing the feedback signal 14 which has been previously mentioned.

While the foregoing system will find utility in various applications, it might be mentioned that one particular use to which the system has been effectively put is in the conducting of radiosonde operations. In carrying out such operations, appropriate radio equipment is carried aloft in the gondola of a balloon and periodic signals are transmitted back to a ground located receiver. However, since various information is to be transmitted, a problem results where a signal cannot be received constantly. For example, it may be assumed that the ground crew is desirous of receiving temperature, pressure, and humidity information from the airborne transmitting set and in order to lighten the load the transmitting set is designed to supply these signals in a periodic fashion. However the temperature signal may be needed for computations practically all the time and therefore extrapolation is extremely desirable, if not mandatory, during those periods in which pressure and humidity signals are being sent from the balloon. Accordingly, it is believed manifest that there are situations in which an extrapolating function is needed.

With the above description in mind, it is believed that an operational sequence of the system will make the utility thereof completely apparent. Assuming, then, that a signal is being received from the source 10 at a particular moment and that this signal differs somewhat from the feedback signal 14, accordingly an error signal is generated and when delivered to the servo motor 16, the motor drives the reduction gears 20. By means of the shaft 24 and the threaded shaft 42 the ball carriage 36 is moved relative to the rotating disc 32, it being remembered that this disc is rotated at a constant speed by the motor 34. Hence the roller 40 will be driven by the upper ball 38 at a speed corresponding to the location of the ball carriage 36 from its center of rotation. This, of course, results in the shaft 52 being rotated. At the same time, the shaft 56 is being rotated, owing to its connection with the servo motor 16. As a result, the two shafts 60 and 52 coact in conjunction with the differential 54 to drive the shaft 62. This happens until a balanced condition is reached or the signal source 10 becomes inactive.

Once the signal from the source 10 has been interrupted or a balanced condition between such signal and the error signal 14 has been reached, then no signal is delivered to the amplifier 12 and consequently there is no error signal fed to the servo motor 16 and the servo motor 16 stops. Although the servo motor 16 stops, it has previously positioned the ball carriage 36 relative to the disc 32 so that the roller 40 is being driven at a speed dependent upon the position of the ball carriage. Even though the motor 16 no longer moves the ball carriage, the rotating disc 32 continues to rotate the roller 40 via the two balls 38 but this now occurs at a constant rate. Therefore it is believed obvious that while the shaft 60 stops, the shaft 52 will continue to rotate and this results in a continued rotation of the shaft 62 in the same direction as just before stoppage of the servo motor 16. Hence the shaft 70 continues to drive the computer 72.

Quite obviously there is no controlled correction involved during the period in which no signal is received from the source 10 but at the same time it can be appreciated that the roller 40 assures that there will be a continued movement in the same direction as far as any rate change is concerned with respect to the preceding signal. Thus when another signal is received from the source 10 a corrective action will take place, if necessary, for the arm 76 of the potentiometer 80 will have been moved in accordance with the shaft 62 during the extrapolating period. Consequently there will be a feedback signal available when the signal source again transmits a signal to the amplifier 12. If the feedback signal 14 is different from the signal received from the source 10, then the servo motor 16 proceeds to correct the feedback signal so that it is in correspondence with the signal sent from the source 10. This will happen periodically as long as a correction is needed. In the absence of sudden fluctuations in the rate of change of the signal source 10 when no signals are being transmitted, then the magnitude of correction needed when the source again becomes active will be minimized. On the other hand, if severe fluctuations in the rate of change have occurred during the inactive signal period, then the system must correct for these deviations when the succeeding signal is received from the source 10, and in the absence of sudden reverse fluctuations of the incoming signal, the magnitude of correction will be minimized inasmuch as there has been introduced the aforesaid extrapolating feature.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed is:

1. An extrapolator system comprising servo motor means, a differential mechanism including a pair of input shafts and an output shaft, integrating means, means connecting said servo motor means to one of said input shafts to cause rotation of said one input shaft when said servo motor means is operating, means connecting the integrating means to said servo motor means and to a constant speed drive, means connecting said integrating means to the other of said input shafts to cause rotation of said output shaft even when said servo motor means is inoperative, feedback means operable in accordance with the position of said output shaft, and means for producing an error signal dependent upon the difference in magnitude between a feedback signal from said feedback means and an incoming signal having discontinuous characteristics, said error signal controlling said servo motor means.

2. An extrapolator system comprising motor means operable upon receipt of a discontinuous signal, a differential having a pair of input shafts and an output shaft, means for continuously rotating one of said input shafts, the other of said input shafts being connected to said motor means, and means for controlling said last mentioned means by said motor means during operation of said motor means, and means for controlling said motor means in accordance with any derived difference between said discontinuous signal and a signal representative of the rotative position of said output shaft, whereby said motor means when operating acts to minimize the magnitude of said derived difference.

3. An extrapolator system comprising means for comparing a discontinuous signal with a feedback signal to produce an error signal when said feedback signal differs from said discontinuous signal, servo motor means controlled in accordance with said error signal, a constant speed motor, an integrator including means actuated by said servo motor means, means actuated by said constant speed motor and driven means controlled by said two actuated means, a differential having a pair of input shafts and an output shaft, one of said input shafts being connected to the driven means of said integrator and the other of said input shafts being connected to said servo motor means, whereby during a period when no signal is being received said output shaft will continue to rotate in the direction it was turning just prior to the interruption of said discontinuous signal.

4. An extrapolator system comprising means for producing a discontinuous signal, servo motor means responsive to said signal, an integrator including a disc and ball means engaging one side of said disc, means for rotating said disc at a constant speed, a cylindrical roller engaging said ball means so as to be driven at a speed dependent upon the location of said ball means, a differential mechanism coupled to said roller and to said servo motor means, an output shaft connected to said differential, and means actuated by said output shaft for providing a feedback signal to said servo motor means, whereby any difference between said feedback signal and said discontinuous signal causes said servo motor means to operate in a direction to effect a balancing of said signals.

5. An extrapolator system in accordance with claim 4 in which said feedback means includes a potentiometer having a movable arm actuated by said output shaft.

No references cited.